US012660757B2

(12) United States Patent
Kurkowski et al.

(10) Patent No.: US 12,660,757 B2
(45) Date of Patent: Jun. 23, 2026

(54) GRAIN CLEANING SYSTEM FOR A COMBINE HARVESTER

(71) Applicant: AGCO Corporation, Duluth, GA (US)

(72) Inventors: Kye J. Kurkowski, Hesston, KS (US); Tyler Gleason, Hesston, KS (US); Eric Wane Bolton, Buhler, KS (US); Clay Reinecke, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 376 days.

(21) Appl. No.: 18/447,654

(22) Filed: Aug. 10, 2023

(65) Prior Publication Data

US 2024/0065172 A1    Feb. 29, 2024

Related U.S. Application Data

(60) Provisional application No. 63/373,223, filed on Aug. 23, 2022.

(51) Int. Cl.
*A01F 12/44* (2006.01)
*A01D 41/127* (2006.01)

(52) U.S. Cl.
CPC ........ *A01F 12/448* (2013.01); *A01D 41/1276* (2013.01); *A01F 12/446* (2013.01)

(58) Field of Classification Search
CPC ...... A01F 12/448; A01F 12/446; A01F 12/44; A01D 41/1276
See application file for complete search history.

(56) References Cited

U.S. PATENT DOCUMENTS

| | | | | |
|---|---|---|---|---|
| 923,269 | A | 6/1909 | Johantgen | |
| 4,253,471 | A * | 3/1981 | Klimmer | A01F 12/44 460/92 |
| 5,795,223 | A * | 8/1998 | Spiesberger | A01F 12/448 460/94 |
| 8,939,829 | B2 | 1/2015 | Murray et al. | |
| 9,578,810 | B2 | 2/2017 | Duquesne et al. | |
| 10,447,076 | B2 | 10/2019 | Frampton | |
| 2002/0128054 | A1* | 9/2002 | Lauer | A01F 12/448 460/101 |
| 2016/0192591 | A1* | 7/2016 | Missotten | A01F 12/444 460/149 |
| 2019/0327900 | A1* | 10/2019 | Wire | A01D 41/1208 |

OTHER PUBLICATIONS

UK Intellectual Property Office, Search Report for related UK Application No. GB2212759.1, dated Feb. 26, 2023, 3 pages.

* cited by examiner

*Primary Examiner* — Brad Harcourt

(57) ABSTRACT

A grain cleaning apparatus for a combine harvester has a linkage system for moving a grain pan or sieve with an oscillatory movement. A configuration of the linkage system is adjusted for example in dependence on a lateral inclination of the combine harvester, in particular by setting the position of a pair of arms of the linkage system, so that some points within the linkage system are fixed and other points are adjustable depending on the angle of inclination (but then remain static for a constant angle of inclination).

19 Claims, 4 Drawing Sheets

GRAIN CLEANING SYSTEM FOR A COMBINE HARVESTER

CROSS-REFERENCE TO RELATED APPLICATIONS

This application claims the benefit of the filing date of U.S. Provisional Patent Application 63/373,223, "A Grain Cleaning System for a Combine Harvester," filed Aug. 23, 2022, the entire disclosure of which is incorporated herein by reference.

FIELD

Embodiments of the present disclosure relate generally to combine harvesters, and in particular to the grain cleaning system used within a combine harvester.

BACKGROUND

A combine harvester typically includes a threshing system for detaching grains of cereal from the ears of cereal, a separating apparatus downstream of the threshing system, and a grain cleaning apparatus for receiving grain from the separating apparatus. The grain is collected in a grain tank, and from the grain tank the grain can be unloaded by a grain unloading system, for example to a trailer pulled by a tractor which runs alongside the combine harvester.

The initial threshing creates a flow of grain to a stratification pan of the separating apparatus. The separating function further downstream of the threshing system serves to separate further grain from the crop stream and this separated grain passes through a grate-like structure onto an underlying return pan. The stratification pan and return pan are driven in an oscillating manner to convey the grain and MOG accordingly.

The crop stream collected by the stratification pan and return pan typically includes a proportion of straw, chaff, tailings and other unwanted material such as weed seeds, bugs, and tree twigs. The grain cleaning apparatus removes this unwanted material thus leaving a clean sample of grain to be delivered to the tank. A grain cleaning unit for example comprises a fan unit and sieves, the main sieve being known as the chaffer.

The sieves are also driven with an oscillatory movement to transport the grain towards the grain tank. In particular, there is a fore/aft motion with a vertical component.

It is known to provide hillside compensation for the operation of the cleaning system. When operating on a hillside, there is a tendency for the grain to slope to the side. A sieve motion is used to compensate for this, by adding a side-to-side oscillatory component to the sieve shaking movement. This side-to-side movement can also be used to promote an even distribution of grain, even when operating on the flat.

It has been recognized in EP 2 934 086 that the combination of a side-to-side oscillator motion with a fore/aft motion results in an arc movement which reduces the effectiveness of the side-shaking motion. A linkage system is disclosed which creates a near linear diagonal sieve motion. The linkage is based on a Watt's linkage. This design compensates for the hillside angle, and in essence the motion throws the grain uphill. A movement in a third dimension is added by the linkage.

The linkage in EP 2 934 086 is provided on a rotating plate so that the positions of the fixed linkage points can be adjusted relative to the chassis of the combine harvester. However, due to the design complexity, the system is difficult to implement.

There is therefore a need for an improved grain cleaning system.

BRIEF SUMMARY

The invention is defined by the claims.

According to examples in accordance with the invention, there is provided a grain cleaning apparatus for a combine harvester, comprising:

a grain pan or sieve;

a linkage system for moving the grain pan or sieve with an oscillatory movement;

an actuator for setting a configuration of the linkage system, wherein the linkage system comprises:

a first fixed point;

a first arm between the first fixed point and a first adjustable point;

a second fixed point;

a second arm between the second fixed point and a second adjustable point:

three linkages in series between the first adjustable point and the second adjustable point, wherein the motion of the grain pan or sieve is constrained by the movement of a middle one of the three linkages, and wherein the first and second adjustable points have a position which is adjusted by the actuator.

In this grain cleaning apparatus, the geometry of the linkage system is altered, rather than the orientation of the entire linkage system. In this way, the response of the linkage system can be made symmetrical, for example to opposite angles of inclination. The linkage system can be fixed (at the first and second fixed points) to the combine harvester chassis, making the arrangement simpler. The symmetry means the linkage system can be positioned at either side of the combine harvester, or at both sides if multiple grain pans or sieves are controlled. The linkage system may be considered to comprise a Watt's linkage with an adjustable configuration.

The arrangement is more compact that earlier systems and it avoids the need for additional compensation for asymmetry so that increased accelerations and forces can be applied. The output movement may be applied to multiple points (e.g. multiple sieves or pans) within a system so may be part of a modular system.

The grain cleaning apparatus may be used to improve grain uniformity, even when operating on the flat. For example, the first and second adjustable points may be selected to deliver the most effective uniformity of distribution of grain. However, the actuator is most preferably for setting a configuration of the linkage system in dependence on a lateral inclination of the combine harvester, and the first and second adjustable points have a position which is adjusted by the actuator in dependence on the angle of inclination. Thus, the linkage system is most preferably used for hillside compensation.

The grain cleaning apparatus preferably further comprises a driver for inducing an oscillatory movement to the grain pan or sieve, with the first and second adjustable points stationary for a constant angle of inclination. Known driving arrangements may be used, such as an eccentric mechanism on a shaft, or a crank arrangement that supports the grain pan or sieve. Any suitable mechanism may be used that makes an oscillating motion. Other examples are a so-called wobble box or a hypocycloidal gearbox.

The second arm for example has a control end at an opposite side of the second fixed point to the second adjustable point, and wherein the linkage system comprises a control arm between the first adjustable point and the control end, wherein the actuator comprises a position controller for setting a position of the control arm in dependence on the angle of inclination, thereby to set the positions of the first and second adjustable points. In this way, a single actuator sets the position of both adjustable points.

The first and second adjustable points are for example adjustable between first and second end positions, wherein the first end position is for (maximum) inclination in one lateral direction and the second end position is for (maximum) inclination in an opposite lateral direction. The hillside compensation is symmetrical.

In the first or second positions, the grain pan or sieve is driven with an oscillatory motion in a diagonal fore/aft and lateral direction. This compensates for the hillside slope.

A mid-position between the first and second end positions is for example for zero lateral inclination. In this mid position, the grain pan or sieve is driven with an oscillatory motion (only) in a fore/aft direction.

The grain cleaning apparatus preferably comprises an inclination sensor for sensing an angle of lateral inclination of the combine harvester. In practice, the inclination sensor is a main central part of the combine harvester rather than being introduced as part of the grain cleaning apparatus.

The grain cleaning system for example comprises:
a return pan;
a stratification pan for receiving the harvested crop material from a front end of the return pan;
a fan; and
a sieve arrangement for receiving the harvested crop material from a rear end of the stratification pan, wherein the grain pan or sieve comprises a sieve of the sieve arrangement.

Thus, the grain pan or sieve which is controlled with the oscillatory motion is a sieve of the sieve arrangement downstream of the return pan and stratification pan.

The sieve arrangement for example comprises:
a chaffer sieve for conveying harvested crop material in a generally rearward direction; and
a lower sieve,
wherein the grain cleaning system comprises a clean grain chute below the lower sieve.

Either one or both of the sieves may be driven using the arrangement described. For example, only the chaffer sieve may be given the lateral movement, but the mechanism could be applied to any oscillating, grain conveying pan or cleaning sieve, which could thus include return pans, stratification pans, preparation pans, sieve frames and boxes.

The grain cleaning system may then comprise a second chute for directing tailings to a tailings collection trough.

The invention also provides a combine harvester comprising:
a crop cutting head;
a threshing system; and
the grain cleaning system defined above for receiving the cut and threshed crop material.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

Figures 1, 2:
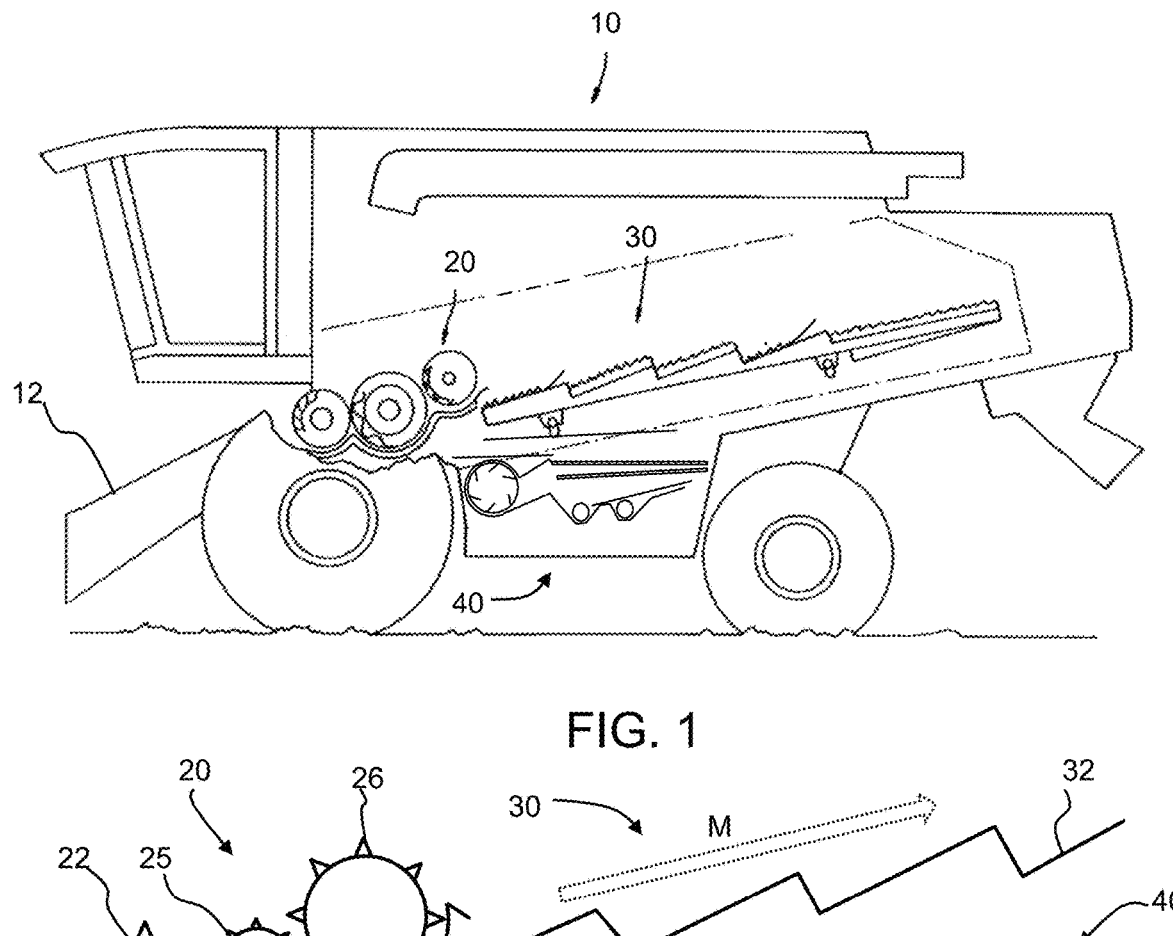
FIG. 1 shows a combine harvester which may be adapted in accordance with the invention.
FIG. 2 shows one example of threshing system and grain cleaning apparatus in more detail.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure relates to the grain cleaning apparatus of a combine harvester, and in particular relates to the oscillatory movement applied to sieves or pans within the grain cleaning apparatus, for example to compensate for the angle of inclination of the combine harvester. However, the general configuration of a combine harvester will first be described.

FIG. 1 shows a known combine harvester 10 to which the invention may be applied. The combine harvester includes a threshing unit 20 for detaching grains of cereal from the ears of cereal, and a separating apparatus 30 which is connected downstream of the threshing unit 20. The threshing system comprises one or more threshing units, in particular rotors, and associated concaves. In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

The combine harvester has a front elevator housing 12 at the front of the machine for attachment of a crop cutting head (known as the header, not shown). The header when attached serves to cut and collect the crop material as it progresses across the field, the collected crop stream being conveyed up through the elevator housing 12 into the threshing unit 20.

In the example shown, the threshing system 20 is a tangential-flow 'conventional' threshing system, i.e. formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars (not shown) which act upon the crop stream to thresh the grain or seeds from the remaining material, the majority of the threshed grain passing through the underlying grate and onto a stratification pan (also sometimes known as the grain pan).

There are also axial threshing systems, i.e. formed by rotating elements with an axis of rotation in the longitudinal direction (direction of travel). For example, the threshing section may have axially-aligned rasp bars spaced around the front section whilst the separating section has separating elements or fingers arranged in a pattern, e.g. a spiral pattern, extending from the rasp bars to the rear of the rotor.

The conventional tangential flow threshing (and separating) unit 20 and separating device 30 are shown in FIG. 2 in more detail, together with a cleaning apparatus 40.

FIG. 2 shows one particular design of the threshing unit. The threshing unit 20 includes a rotor 22 (threshing cylinder) below which is mounted a concave 24 (a concave-shaped grate). The threshing cylinder 22 includes rasp bars (not shown) which act upon the crop stream to thresh the grain or seeds from the remaining material, the majority of the threshed grain passing through the underlying concave 24 and onto a stratification pan 42 (also known as the grain pan), which for convenience is in this disclosure considered to be part of the grain cleaning apparatus 40.

The threshing unit 20 also comprises a beater cylinder 25 (also with a transverse rotation axis and creating a tangential flow), downstream of the threshing cylinder and a tangential-flow multi-crop separator cylinder 26 (also with a lateral rotation axis and creating a tangential flow) downstream of the beater cylinder 25.

The remainder of the crop material including straw, tailings and un-threshed grain are passed from the threshing unit 20 into the separating apparatus 30 as shown by arrow M.

In the example shown, the separating apparatus 30 includes a plurality of parallel, longitudinally-aligned, straw walkers 32, and this is suitable for the case of a so-called straw-walker combine. However, the separating apparatus 30 may instead include one or two longitudinally-aligned rotors which rotate about a longitudinal axis and convey the crop stream rearwardly in a ribbon passing along a spiral path. This is the case for a so-called axial or hybrid combine.

In all cases, the separating apparatus 30 serves to separate further grain from the crop stream, and this separated grain passes through a grate-like structure onto an underlying return pan 44. The residue crop material, predominantly made up of straw, exits the machine at the rear. Although not shown in FIG. 1, a straw spreader and/or chopper may be provided to process the straw material as required.

The threshing apparatus 20 and separating apparatus 30 do not remove all material other than grain, "MOG", from the grain so that the crop stream collected by the stratification pan 42 and return pan 44 typically includes a proportion of straw, chaff, tailings and other unwanted material such as weed seeds, bugs, and tree twigs. The remainder of the grain cleaning apparatus 40 (i.e. a grain cleaning unit 50) is provided to remove this unwanted material thus leaving a clean sample of grain to be delivered to the tank.

For clarity, the term 'grain cleaning apparatus' is intended to include the stratification pan 42, the return pan 44 and other parts which form the grain cleaning unit 50 (also known as a cleaning shoe).

The grain cleaning unit 50 also comprises a fan unit 52 and sieves 54 and 56. The upper sieve 54 is known as the chaffer.

The stratification pan 42 and return pan 44 are driven in an oscillating manner to convey the grain and MOG accordingly. Although the drive and mounting mechanisms for the stratification pan 42 and return pan 44 are not shown, it should be appreciated that this aspect is well known in the art of combine harvesters and is not critical to disclosure of the invention. Furthermore, it should be appreciated that the two pans 42, 44 may take a ridged construction as is known in the art.

The grain passing through concave grate 24 falls onto the front of the stratification pan 42 as indicated by arrow A in FIG. 2. This material is conveyed rearwardly (in the direction of arrow B in FIG. 2) by the oscillating motion of the stratification pan 42 and the ridged construction thereof. Material passing through the grate of the separator apparatus 30 falls onto the return pan 44 and is conveyed forwardly by the oscillating motion and ridged construction thereof as shown by arrow C.

It is noted that "forwardly" and "rearwardly" refer to direction relative to the normal forward direction of travel of the combine harvester.

When the material reaches a front edge of the return pan 44 it falls onto the stratification pan 42 and on top of the material conveyed from the threshing unit 20 as indicated by arrow B.

The combined crop streams thus progress rearwardly towards a rear edge of the stratification pan 42. Whilst conveyed across the stratification pan 42, the crop stream, including grain and MOG, undergoes stratification wherein the heavier grain sinks to the bottom layers adjacent stratification pan 42 and the lighter and/or larger MOG rises to the top layers.

Upon reaching the rear edge of the stratification pan 42, the crop stream falls onto the chaffer 54 which is also driven in a fore-and-aft oscillating motion. The chaffer 54 is of a known construction and includes a series of transverse ribs or louvers which create open channels or gaps therebetween. The chaffer ribs are angled upwardly and rearwardly so as to encourage MOG rearwardly whilst allowing the heavier grain to pass through the chaffer onto an underlying second sieve 56.

The chaffer 54 is coarser (with larger holes) than second sieve 56. Grain passing through chaffer 54 is incident on the lower sieve 56 which is also driven in an oscillating manner and serves to remove tailings from the stream of grain before being conveyed to on-board tank (not shown) by grain collecting auger 70 which resides in a transverse trough 72 at the bottom of the grain cleaning unit 50. Tailings blocked by sieve 56 are conveyed rearwardly by the oscillating motion thereof to a rear edge from where the tailings are directed to the returns auger 60 for reprocessing in a known manner. The grain collecting auger 70 delivers the grain to a grain tank, and a grain unloading system enables the grain to be removed from the grain tank.

The invention relates to the oscillatory movement applied to components, such as sieves or grain pans, of the grain cleaning system. In particular, the invention provides a grain cleaning apparatus for a combine harvester that has a linkage system for moving a grain pan or sieve with an oscillatory movement. A configuration of the linkage system is adjusted, for example in dependence on a lateral inclination of the combine harvester, in particular by setting the position of a pair of arms of the linkage system, so that some points within the linkage system are fixed and other points are adjustable. The adjustment in preferred examples depends on the angle of inclination (but then remains static for a constant angle of inclination).

Figure 3:
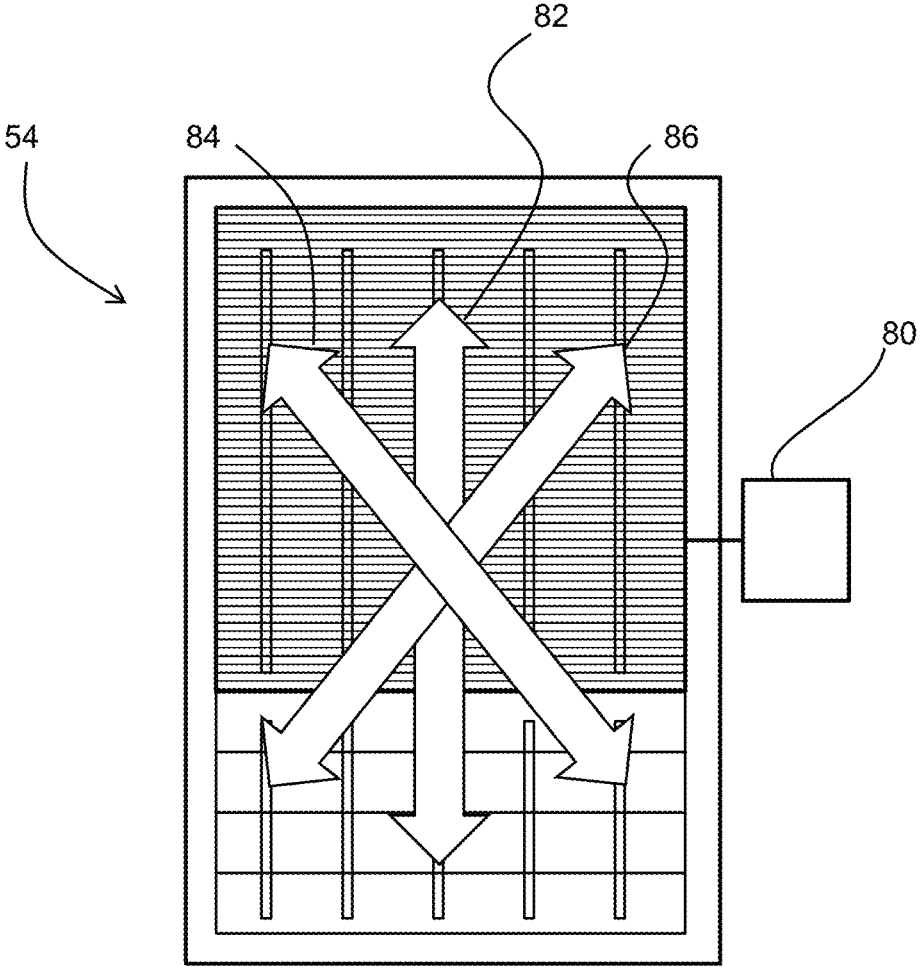
FIG. 3 shows a sieve of the grain cleaning system and shows how it is desired to move the sieve with an oscillatory movement.

FIG. 3 shows the chaffer sieve 54 as an example of the component to which the oscillatory movement is to be applied, to provide compensation for a hillside slope. As mentioned above, the oscillatory movement may be applied to other components, including any oscillating member of the cleaning system, and it may be applied to multiple components.

A separate drive system 80 drives the oscillatory movement of the sieve 54. The sieve 54 is for example suspended at its corners by suspension rods with ball joint connections at the top and bottom. The sieve thus has freedom of movement in all directions within the plane of the sieve. The separate drive system for example comprises an eccentric drive arrangement which sets the sieve into an oscillatory movement by actuating the suspension rods. The separate drive system for imparting the oscillatory movement is well known and does not require modification in order to implement the system of the invention. The oscillatory movement for example has a frequency of around 5 Hz. The invention relates to a linkage system which is able to constrain the movement of the sieve so that it follows a movement with reduced degrees of freedom.

In particular for the preferred implementation for hillside compensation, when on a laterally flat slope, a fore/aft oscillatory movement is desired as represented by arrow 82. However, when on a lateral slope, a diagonal but linear movement is desired, with a fore/aft component and a lateral component. Arrow 84 represents the desired motion direction for one slope direction and arrow 86 represents the desired motion direction an opposite slope direction.

It has been proposed to compensate for the incline in order to attempt to provide the desired motion patterns, for example in EP 2 934 086 referenced above. A Watt's type linkage has been proposed for generating a linear motion from a rotary drive input. The system of EP 2 934 086 requires rotation of a supporting plate of the Watt's linkage system to set the linkage system to a particular orientation angle.

Figures 4, 5, 6:
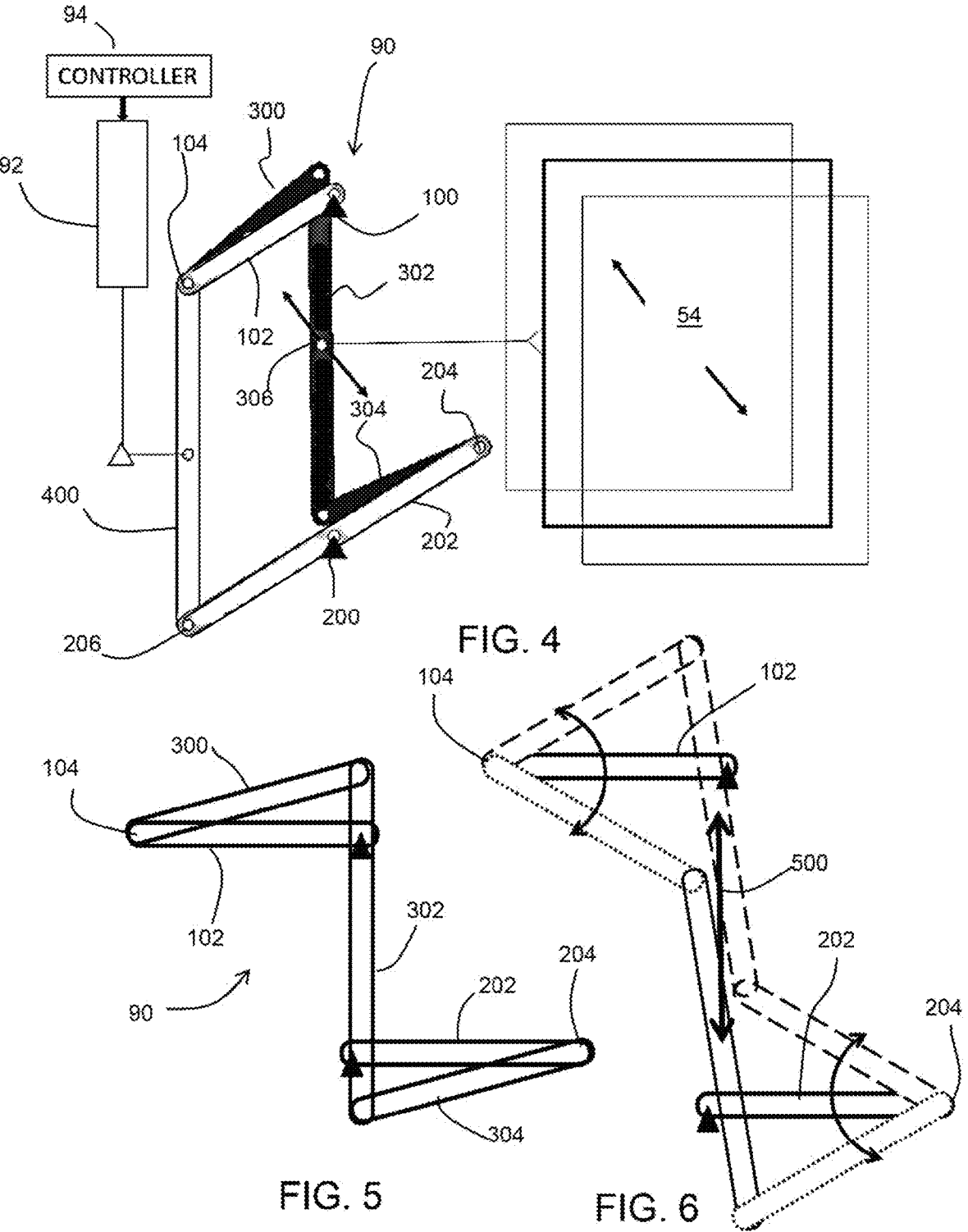
FIG. 4 shows an example of a linkage system for controlling the oscillatory movement of the sieve.
FIG. 5 shows the linkage system in a first configuration for zero incline.
FIG. 6 shows the movement of the linkage system when in the first configuration.

The invention provides an improved design of the linkage system, as shown in FIG. 4.

As in the known approach, the linkage system 90 is part of a grain cleaning apparatus for a combine harvester which includes a grain pan or sieve. An actuator 92 is used for setting a configuration of the linkage system in dependence on a lateral inclination of the combine harvester.

The linkage system comprises a first fixed point 100 and a first arm 102 between the first fixed point 100 and a first adjustable point 104. A second fixed point 200 is connected to a second arm 202 between the second fixed point 200 and a second adjustable point 204. In the figures, the fixed points are at the locations where solid triangles are shown. The first and second arms 102, 202 have the same length and they can rotate about their connections to the fixed points.

Three linkages 300, 302, 304 are in series between the first adjustable point 104 and the second adjustable point 204. In the example shown, the motion of the sieve 54 is constrained by the movement of a center 306 of a middle one 302 of the three linkages. However, any other location along the middle one 302 of the three linkages may be coupled to the sieve, in that the entire link moves in the same linear path so any point of connection to that link may be used to generate the desired geometry. The first and third linkages 300, 304 have the same length, and preferably the same length as the first and second arms 102, 202.

The first and second adjustable points 104, 204 have a position which is adjusted by the actuator 92, under the control of a controller 94, in preferred examples in dependence on the angle of inclination.

The adjustable points may be moved by their own respective actuators, but FIG. 4 shows a design in which a single actuator 92 sets the position of both adjustable points. For this purpose, the second arm 202 has a control end 206 at an opposite side of the second fixed 200 point to the second adjustable point 204. The second fixed point 200 is midway along the second arm 202. The linkage system 90 comprises a control arm 400 between the first adjustable point 104 and the control end 206. The actuator functions as a position controller for setting a position of the control arm 400 in dependence on the angle of inclination, thereby to set the positions of the first and second adjustable points. In use, the first and second arms remain static (for a given setting of the linkage system) and only the three linkages 300, 302, 304 move.

The linkage system is set into motion by the separate oscillatory drive applied to the sieve.

In this grain cleaning apparatus, the geometry of the linkage system is for example altered depending on the angle of inclination, rather than the orientation of the entire linkage system. The internal geometry of the system is manipulated rather than the orientation of the entire linkage system. In this way, the response of the linkage system can be made symmetrical to opposite angles of inclination. The linkage system can be fixed at the first and second fixed points 100, 200 to the combine harvester chassis, making the arrangement simpler. The linkage system may be considered to comprise a Watt's linkage with an adjustable configuration.

The first and second adjustable points 104, 204 are adjustable between first and second end positions on either side of a middle position. Fine adjustment is possible within the overall range, in dependence on the angle and direction of inclination. The mid position and two extreme positions are shown in FIGS. 5 to 8.

FIGS. 5 to 8 show the first and second arms 102, 202 (but not the extension of the second arm to the end point 206) and three linkages 300, 302, 304. In FIG. 5, the first and second arms 102, 104 are orthogonal to the middle linkage 302. This is the mid position for a zero incline. The linkage system 90 can be adjusted by changing the angles of the first and second arms 102, 202 thereby changing the location of the adjustable points 104, 204.

FIG. 6 shows how the three linkages move when the linkage system is configured as in FIG. 5. The two dotted shapes of the three linkages represent the extremes of the oscillatory movement. As explained above, the first and second arms 102, 202 remain static. The arrow 500 shows how the midpoint of the middle linkage 302 moves in a linear fore/aft direction. This may be considered to be the convention layout of a Watt's linkage system.

Figures 7, 8:
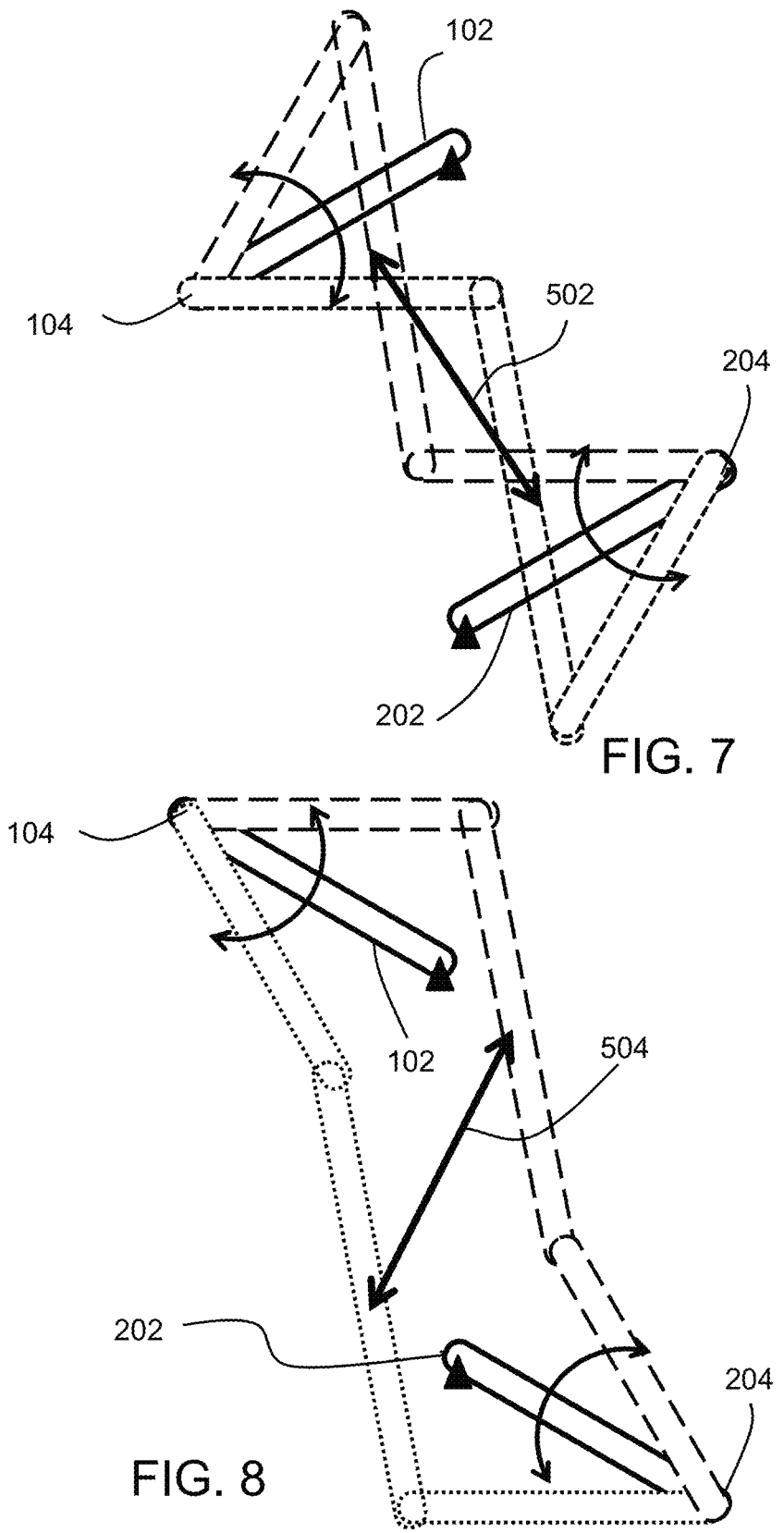
FIG. 7 shows the movement of the linkage system when in a second configuration for a first lateral incline.
FIG. 8 shows the movement of the linkage system when in a third configuration for a second lateral incline opposite to the first lateral incline.

FIG. 7 shows a configuration of the linkage system for a maximum compensated incline in one direction. The first and second arms 102, 202 have been rotated about the fixed points anticlockwise to define new positions for the adjustable points. The two dotted shapes of the three linkages again represent the extremes of the oscillatory movement.

As explained above, the first and second arms 102, 202 remain static. The arrow 502 shows how the midpoint of the middle linkage 302 moves in a diagonal but near linear direction (offset anticlockwise from the fore/aft direction). This may be considered to be a skewed modification to Watt's linkage system.

FIG. 8 shows a configuration of the linkage system for a maximum compensated incline in an opposite direction. The first and second arms 102, 202 have been rotated about the fixed points clockwise to define new positions for the adjustable points. The two dotted shapes of the three linkages again represent the extremes of the oscillatory movement. Again, the first and second arms 102, 202 remain static. The arrow 504 shows how the midpoint of the middle linkage 302 moves in a diagonal but near linear direction (offset anticlockwise from the fore/aft direction). This may be considered to be an oppositely skewed modification to Watt's linkage system.

An inclination sensor is used for sensing an angle of lateral inclination of the combine harvester and this sensing information is provided to the controller 94.

It is noted that the diagonal path will not be perfectly linear and will have some S-shaped curvature, but the path approximates more closely to a linear path that existing approaches.

The main purpose of the linkage system is to provide hillside compensation, as explained above. However, another use is to improve the distribution of grain, for example based on a feedback signal of a sensor which senses the grain distribution. Different directions of the oscillatory movement may be suitable for improving the uniformity of the grain distribution, so the linkage system actuator can be controlled in dependence on this feedback, instead of being used to provide hillside compensation.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

All references cited herein are incorporated herein in their entireties. If there is a conflict between definitions herein and in an incorporated reference, the definition herein shall control.

What is claimed is:

1. A grain cleaning apparatus for a combine harvester, comprising:
   a grain pan or sieve;
   a linkage system for moving the grain pan or sieve with an oscillatory movement;
   a driver for inducing the oscillatory movement to the grain pan or sieve;
   an actuator for setting a configuration of the linkage system in dependence on a lateral inclination of the combine harvester;
   wherein the linkage system comprises:
      a first fixed point;
      a first arm between the first fixed point and a first adjustable point;

a second fixed point;
      a second arm between the second fixed point and a second adjustable point;
      three linkages in series between the first adjustable point and the second adjustable point, wherein the motion of the grain pan or sieve is constrained by the movement of a middle one of the three linkages,
   and wherein the first and second adjustable points have a position which is adjusted by the actuator, with the first and second adjustable points stationary for a constant angle of inclination, and wherein the first and second adjustable points have a position which is adjusted by the actuator in dependence on the angle of inclination.

2. The grain cleaning apparatus of claim 1, comprising an inclination sensor for sensing an angle of lateral inclination of the combine harvester.

3. The grain cleaning system of claim 1, comprising:
   a return pan;
   a stratification pan for receiving the harvested crop material from a front end of the return pan;
   a fan; and
   a sieve arrangement for receiving the harvested crop material from a rear end of the stratification pan, wherein the grain pan or sieve comprises a sieve of the sieve arrangement.

4. The grain cleaning system of claim 3, wherein the sieve arrangement comprises:
   a chaffer sieve for conveying harvested crop material in a generally rearward direction; and
   a lower sieve,
   wherein the grain cleaning system comprises a clean grain chute below the lower sieve.

5. The grain cleaning system of claim 3, comprising a second chute for directing tailings to a tailings collection trough.

6. A grain cleaning apparatus for a combine harvester, comprising:
   a grain pan or sieve;
   a linkage system for moving the grain pan or sieve with an oscillatory movement;
   an actuator for setting a configuration of the linkage system in dependence on a lateral inclination of the combine harvester;
   wherein the linkage system comprises:
      a first fixed point;
      a first arm between the first fixed point and a first adjustable point;
      a second fixed point;
      a second arm between the second fixed point and a second adjustable point;
      three linkages in series between the first adjustable point and the second adjustable point, wherein the motion of the grain pan or sieve is constrained by the movement of a middle one of the three linkages,
   wherein the first and second adjustable points have a position which is adjusted by the actuator, and wherein the first and second adjustable points have a position which is adjusted by the actuator in dependence on the angle of inclination; and
   wherein the second arm has a control end at an opposite side of the second fixed point to the second adjustable point, wherein the linkage system comprises a control arm between the first adjustable point and the control end, wherein the actuator comprises a position controller for setting a position of the control arm in dependence on the angle of inclination, thereby to set the positions of the first and second adjustable points.

7. A combine harvester comprising:
a crop cutting head;
a threshing system; and
the grain cleaning system of claim 3 for receiving the cut and threshed crop material.

8. The grain cleaning system of claim 6, comprising:
a return pan;
a stratification pan for receiving the harvested crop material from a front end of the return pan;
a fan; and
a sieve arrangement for receiving the harvested crop material from a rear end of the stratification pan, wherein the grain pan or sieve comprises a sieve of the sieve arrangement.

9. The grain cleaning system of claim 8, wherein the sieve arrangement comprises:
a chaffer sieve for conveying harvested crop material in a generally rearward direction; and
a lower sieve,
wherein the grain cleaning system comprises a clean grain chute below the lower sieve.

10. The grain cleaning system of claim 8, comprising a second chute for directing tailings to a tailings collection trough.

11. A combine harvester comprising:
a crop cutting head;
a threshing system; and
the grain cleaning system of claim 8 for receiving the cut and threshed crop material.

12. A grain cleaning apparatus for a combine harvester, comprising:
a grain pan or sieve;
a linkage system for moving the grain pan or sieve with an oscillatory movement;
an actuator for setting a configuration of the linkage system in dependence on a lateral inclination of the combine harvester;
wherein the linkage system comprises:
a first fixed point;
a first arm between the first fixed point and a first adjustable point;
a second fixed point;
a second arm between the second fixed point and a second adjustable point;
three linkages in series between the first adjustable point and the second adjustable point, wherein the motion of the grain pan or sieve is constrained by the movement of a middle one of the three linkages,
wherein the first and second adjustable points have a position which is adjusted by the actuator, and wherein the first and second adjustable points have a position which is adjusted by the actuator in dependence on the angle of inclination; and
wherein the first and second adjustable points (104, 204) are adjustable between first and second end positions, wherein the first end position is for inclination in one lateral direction and the second end position is for inclination in an opposite lateral direction.

13. The grain cleaning apparatus of claim 12 wherein in the first or second positions, the grain pan or sieve is driven with an oscillatory motion in a diagonal fore/aft and lateral direction.

14. The grain cleaning apparatus of claim 12, wherein a mid-position between the first and second end positions is for zero lateral inclination.

15. The grain cleaning apparatus of claim 14, wherein in the mid position, the grain pan or sieve is driven with an oscillatory motion in a fore/aft direction.

16. The grain cleaning system of claim 12, comprising:
a return pan;
a stratification pan for receiving the harvested crop material from a front end of the return pan;
a fan; and
a sieve arrangement for receiving the harvested crop material from a rear end of the stratification pan, wherein the grain pan or sieve comprises a sieve of the sieve arrangement.

17. The grain cleaning system of claim 16, wherein the sieve arrangement comprises:
a chaffer sieve for conveying harvested crop material in a generally rearward direction; and
a lower sieve,
wherein the grain cleaning system comprises a clean grain chute below the lower sieve.

18. The grain cleaning system of claim 16, comprising a second chute for directing tailings to a tailings collection trough.

19. A combine harvester comprising:
a crop cutting head;
a threshing system; and
the grain cleaning system of claim 16 for receiving the cut and threshed crop material.

\* \* \* \* \*